United States Patent [19]

Krasin et al.

[11] 3,840,706

[45] Oct. 8, 1974

[54] REMOTE TEST CIRCUIT FOR CARRIER TELEPHONES

[75] Inventors: Lester Q. Krasin; Robert D. McCallum, both of Tulsa, Okla.

[73] Assignee: Seismograph Service Corporation, Tulsa, Okla.

[22] Filed: Oct. 29, 1973

[21] Appl. No.: 410,745

[52] U.S. Cl. ........ 179/15 BF, 179/2.5 R, 179/15 FD
[51] Int. Cl. ........ H04j 1/16
[58] Field of Search ......... 179/2.5 R, 15 FD, 170 F, 179/170 J, 175.3 R, 175.31 R, 175.2 C, 15 BF

[56] References Cited

UNITED STATES PATENTS

| | | | |
|---|---|---|---|
| 2,020,318 | 11/1935 | Jacobs | 179/170 J X |
| 3,651,284 | 3/1972 | Malone | 179/175.31 R |
| 3,748,389 | 7/1973 | Casterline | 179/5 R |
| 3,758,728 | 9/1973 | LeRoch | 179/175.31 R |

*Primary Examiner*—David L. Stewart
*Attorney, Agent, or Firm*—William F. Norris

[57] ABSTRACT

In the preferred embodiment of the invention disclosed herein, a testing circuit is provided in a carrier telephone communication system for determining, from a central office location, the operational status of remote subscriber station terminals. Interrogation of the remote station terminal is accomplished by momentarily reversing the polarity of D.C. voltage applied to the telephone transmission cable. Means are provided at the remote station terminals for detecting the D.C. power voltage reversal and for activating the station terminal transmitter in response thereto. Visual indicating means are provided at the central office for indicating the presence of a carrier signal originated at the station terminal in response to the D.C. voltage reversal.

6 Claims, 3 Drawing Figures

REMOTE TEST CIRCUIT FOR CARRIER TELEPHONES

BACKGROUND OF THE INVENTION

This invention relates to carrier telephone communication systems and more particularly to a system for interrogating a plurality of remote subscriber station terminals from a central office station in a manner to provide, at the central office station, a direct indication of an operable condition in each of the remote stations.

The rapid growth in population and the attendant increase in the demand for expanded telephone service has resulted in the widespread use of multiple channel carrier equipment for providing additional telephone service capability over existing cable pairs. A typical multiple channel carrier installation might include a central office station with one or more central office terminal units from each of which extends a two conductor transmission line, and each central office terminal unit includes a plurality of carrier channel units each including a carrier receiver section and a carrier transmitter section adapted to operate at different predetermined frequencies; a plurality of station terminals connected to each transmission line, each at a telephone subscriber location remote from the central office terminal. All of the station terminals include a receiver section operable at the same frequency as a transmitter section of one of said carrier channel units and a transmitter section operable at another frequency which is the same frequency as a receiver section of the same said channel unit. Power means are located at the central office terminals for supplying D.C. power from the transmission line for operating its receiver and transmitter sections. A typical multiple channel carrier system of a type in which the present invention might be used is disclosed in U.S. Pat. No. 3,475,561.

In the routine operation and maintenance of carrier telephone systems, it is desirable, from time to time, to test the remote subscriber line tap units to assure that they are in an operable condition. Heretofore it has been necessary for a person, either the subscriber or a maintenance man, to actually lift the telephone receiver from its hook in order to activate the station terminal transmitter section and to determine its operable or nonoperable status. The foregoing procedure invariably caused inconvenience to the subscriber, or in his absence from the station terminal location, an inconvenience to the telephone system maintenance personnel.

Systems are known in the prior art, as disclosed by U.S. Pat. No. 2,666,099, that provide simple and effective means for determining continuity of and measuring transmission losses on telephone communication channels by means of conventional "loop-around" connections, and U.S. Pat. No. 3,636,280 discloses means for remotely switching a known impedance across the transmission line to replace the customer's equipment for determining whether a fault is in the transmission line system or in the customer equipment. In these prior art systems, however, it is still necessary that the telephone handset be lifted from its hook to activate the station terminal when it is desired to test the station terminal operating status.

SUMMARY OF INVENTION

Accordingly, it is an object of the present invention to provide a system for remote testing of a plurality of station terminals from a central office station to determine the operational status of said station terminals.

It is a further object of the present invention to provide a testing system for remote station terminals whereby the operational status of the remote station terminals can be determined without disturbing the subscribing party.

It is still a further object of the present invention to provide central office testing means whereby the operational status of remote station terminals can be determined from the central office without interrupting normal telephone service to the remote station terminals.

These and other objects are achieved in accordance with the principles of the invention by providing central office switching means for reversing the polarity of the D.C. power supplied to the transmission line; station terminal means are provided for detecting the reversal of polarity of the D.C. power supplied to the station terminal and for simulating an "off-hook" condition within the station terminal whereby the station terminal transmitter section is activated, thus transmitting its carrier frequency to the transmission line; and means are provided within each carrier channel unit for detecting the presence of its particular carrier frequency and for activating indicating means in response thereto whereby an indication of the operating condition of the remote station terminal is obtained.

BRIEF DESCRIPTION OF THE DRAWINGS

The principles of the invention as well as additional objects and features will be fully comprehended from the appended drawings, given as nonrestrictive examples, in which.

DESCRIPTION OF A PREFERRED EMBODIMENT

Figure 1:
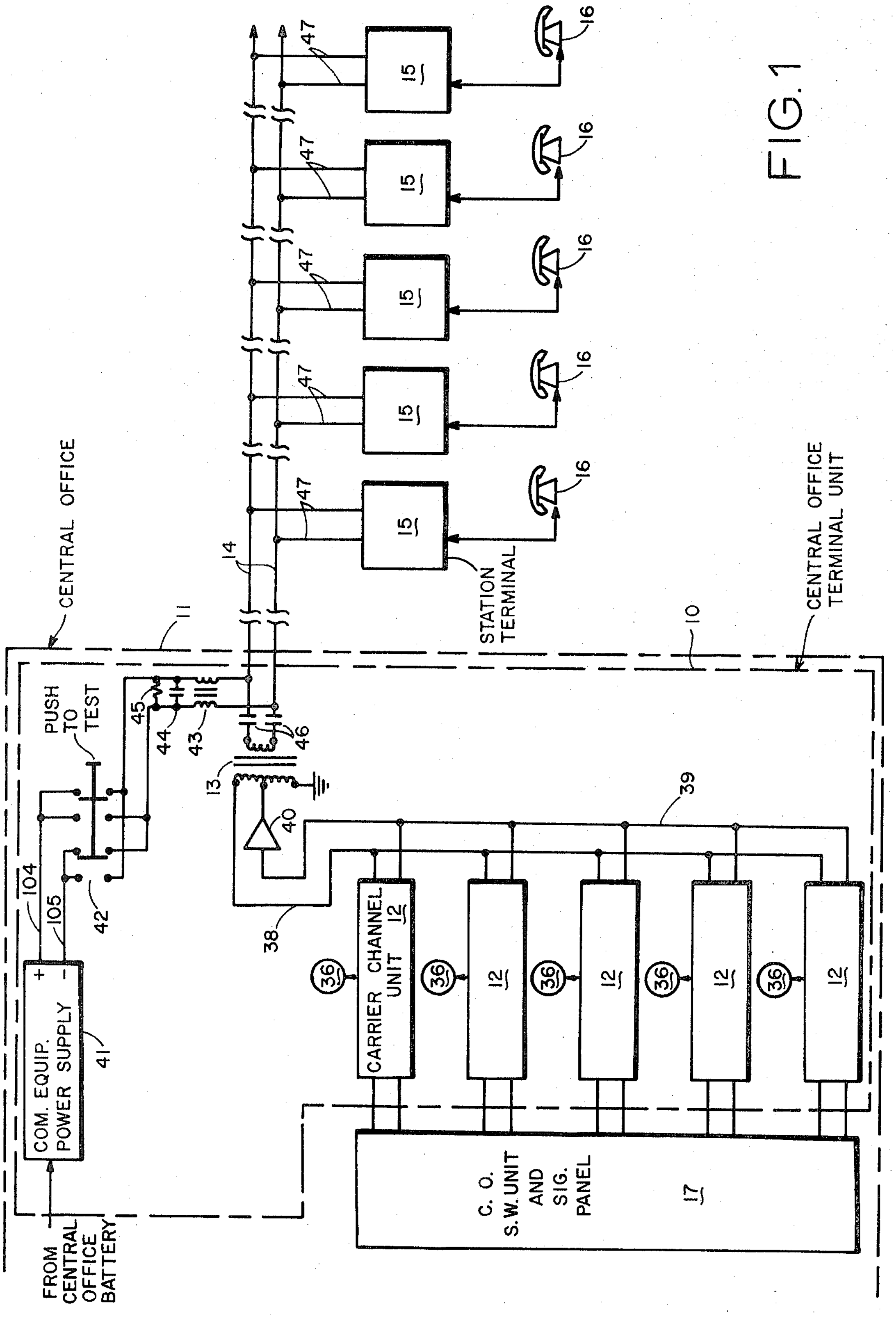
FIG. 1 is a simplified diagram of a multiple channel carrier telephone installation in which the present invention is embodied.

The multiple channel carrier telephone installation represented schematically in FIG. 1 and embodying the principles of the present invention comprises a central office terminal unit 10 which may be installed with other such terminal units at a conventional telephone central office 11. Each terminal unit 10 includes a plurality of carrier channel units 12 which operate in a frequency range of 13–119 KHz and which are identical except for frequency determining elements that establish their channel identity. These channel units are connected in parallel through hybrid transformer 13 to a pair of transmission line conductors 14 that may extend from the central office station for a distance of up to 20 or 30 miles. For each channel unit 12 there is an associated station terminal 15, each of which establishes a telephone subscriber location, and essentially comprises a receiving and transmitting bridge from the transmission line 14 in the field to a subscriber's telephone set 16. Each station terminal 15 receives the carrier frequency energy which is sent down the transmission line conductors 14 from a particular channel unit at the central office station 11 and converts it to a form suitable for direct connection to a subscriber's telephone; and conversely, each station terminal generates its own carrier frequency energy modulation by voice frequency energy from connected subscriber telephone 16 and then transmits it back to the central office station. Each of the carrier channel units is connected to an output of a conventional telephone central office switching unit 17. The switching unit provides the normal telephone switching and signaling functions as in any conventional telephone system.

Figure 2:
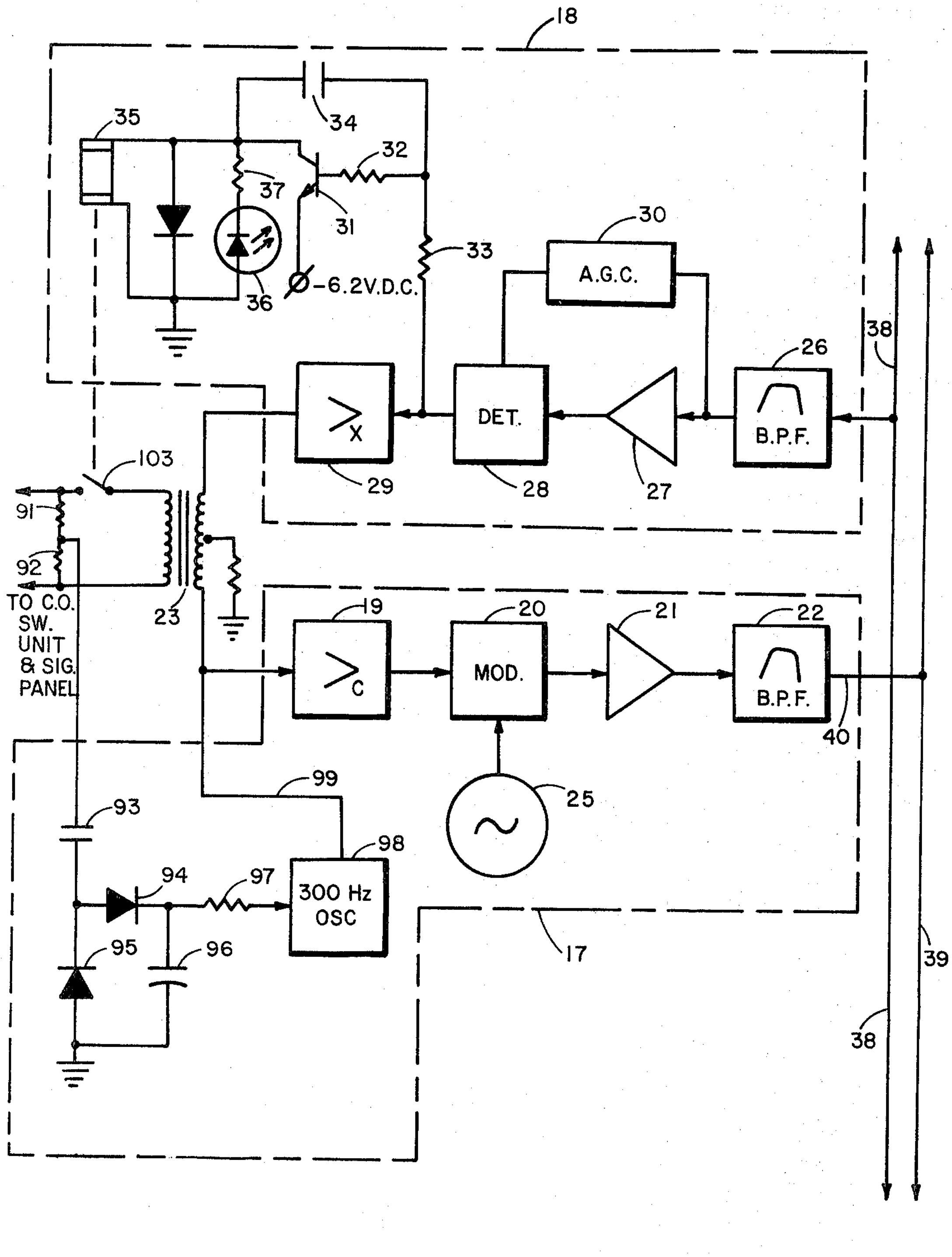
FIG. 2 is a simplified diagram of a carrier channel unit.

With reference now also to FIG. 2, each carrier channel unit 12 has a transmitter section 17 and a receiver section 18 to enable the unit to impose a carrier signal of a predetermined frequency on the connected transmission line 14 and to receive therefrom carrier signal of a different frequency from a station terminal transmitter.

The transmitter section 17 includes a compressor 19, a modulator 20, a carrier frequency amplifier 21 and a bandpass filter 22 all connected in series to an end tap of the secondary of a hybrid transformer 23. A channel oscillator 25 provides an output at a predetermined carrier frequency and is connected by a side branch lead to modulator 20. The channel unit receiver section 18 for receiving modulated carrier frequency energy from the station terminals on the transmission line includes a bandpass filter 26, a carrier frequency amplifier 27, a signal detector 28 and an expander 29 all connected in series to the other end tap of the secondary of hybrid transformer 23. An AGC loop 30 is provided for regulating the gain of receiver section 18. A control amplifier comprising transistor 31, resistors 32 and 33, and capacitor 34 has its input connected to the output of detector 28. A relay coil 35 is connected from the collector of transistor 31 to ground and a light emitting diode 36 is connected in parallel across the relay coil 35 through a resistor 37. Resistor 37 is sized such that when control transistor 31 is in a conducting state and drawing current through relay coil 35, an amount of current will flow through light emitting diode 36 and thereby causing it to emit visible light.

Each carrier channel unit receiving section is connected in parallel to a common receiver lead 38 which is, in turn, connected to an end tap of the primary winding of hybrid transformer 13. In a like manner, the output of the transmitter section of each carrier channel unit is connected in parallel to a common output lead 39 which is connected to the input of a common transmitter amplifier 40 and thence to a center tap of the primary winding of hybrid transformer 13. Another end tap of the primary winding of hybrid transformer 13 is connected to ground. The secondary winding of hybrid transformer 13 is connected to transmission line 14, and thence to the station terminals 15.

D.C. power for operation of all units of the central office terminal unit 10, including the carrier channel units 12, is supplied by a connection, not shown, to a central office negative 48 volt battery supply, also not shown. Each central office terminal unit contains a common equipment power supply 41 which provides 120 volts D.C. that is applied to transmission line 14 and thereby serves as energy source for the station terminals 15. Power from common equipment power supply 41 to transmission line 14 is routed through a double pole, double throw polarity reversing switch 42 which has a "Normal" position being the normally "on" contacts and a spring loaded momentary contact "Test" position. The wiring of switch 24 is such that when the switch is in the normal position, the D.C. voltage on transmission line 14 is of a first relative polarity, and when switch 24 is urged into the "Test" position the polarity of the D.C. voltage on transmission line 14 is reversed. A filter comprising bucking transformer 43, capacitor 44 and resistor 45 prevents carrier frequency energy from flowing to the common equipment power supply and blocking capacitors 46 prevent D.C. current from flowing in the secondary of hybrid transformer 13.

Figure 3:
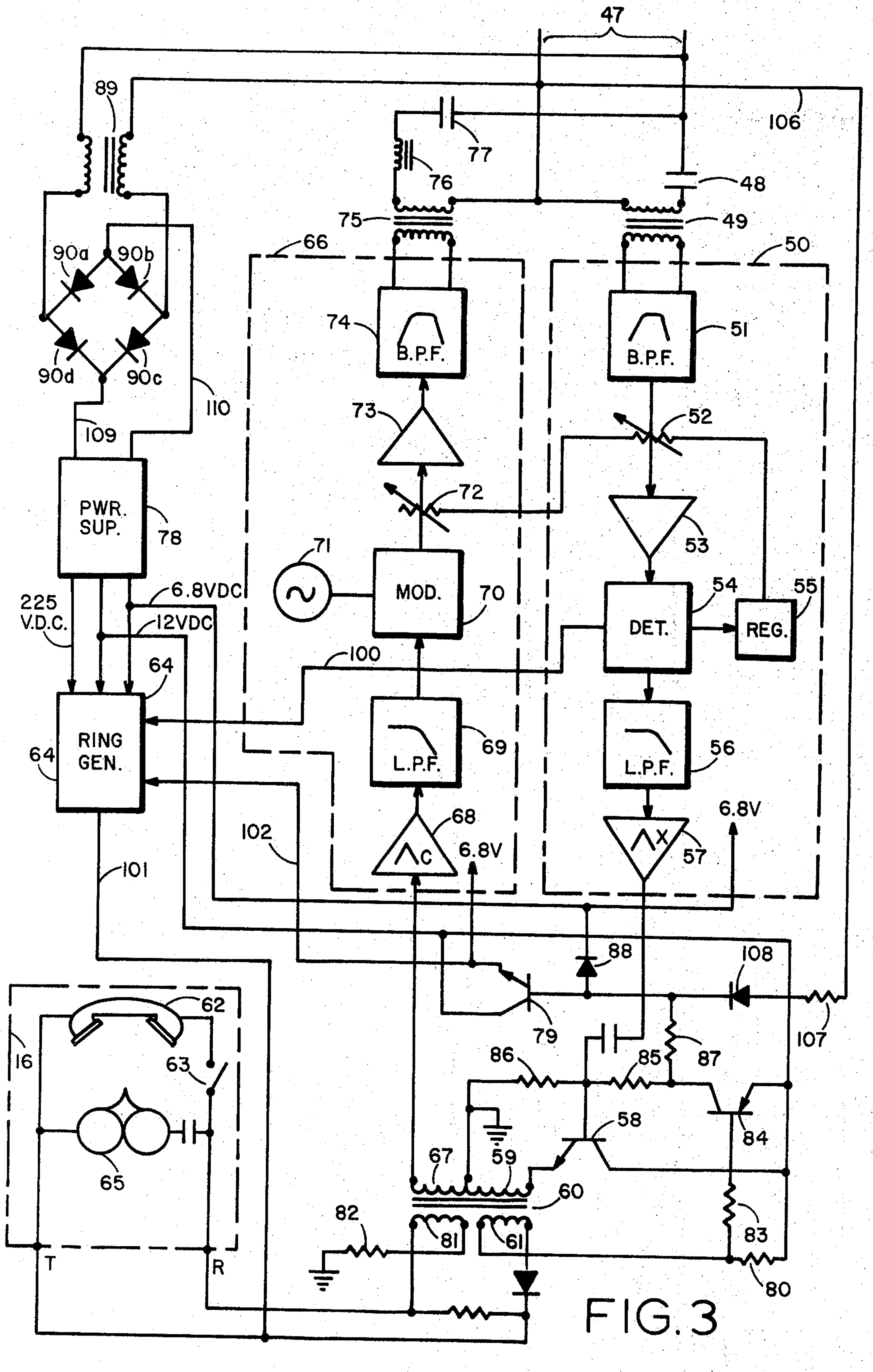
FIG. 3 is a simplified diagram of a station terminal.

With reference to the block diagram of FIG. 3, each station terminal 15 is connected by a pair of branch leads 47 to the transmission line 14 through which carrier frequency energy is transmitted from the central office terminal unit 10. Received energy is capacitively coupled by a capacitor 48 to the primary winding of a carrier frequency coupling transformer 49. The output from the secondary of coupling transformer 27 is applied to the input of a station terminal receiver section 50.

In receiver section 28 of the station terminal, a bandpass filter 51 selects only that energy which is transmitted by its associated central office channel unit. The received energy is attenuated in a variolosser circuit 52 by an amount which is determined by the strength of the incoming signal and then is fed to a carrier frequency amplifier 53. In a detector 54 connected to the output of the amplifier 53, one component of the detected signal is applied to a regulation circuit 55 which controls the attenuation of the variolosser 52. Another component of the incoming detected signal is applied to a voice frequency energy contained in the voice frequency modulated carrier frequency to an expander 57 where it is amplified, expanded. The voice frequency output of receiver section 50 is applied through a voice frequency amplifier transistor 58 to the receiver winding 59 of a differential hybrid transformer 60. Here the energy is coupled to a secondary winding 61 of differential hybrid transformer 60 from whence it flows to the output terminals T and R of the station terminal telephone set 16. When telephone set 16 is in the "off-hook" condition, that is when the telephone 62 is off its cradle and hook switch 63 is closed, the derived voice frequency energy will be the received component of a two-way voice conversation being carried on via the telephone set 16. A third component of the output of detector 54 will actuate a station terminal ring generator 64 thereby ringing a telephone bell 65 when the handset is in the "on-hook" condition and an incoming signal is detected.

When a call is in progress, voice frequency energy from telephone 62 is coupled to the input of a transmitter section 66 via the transmitter winding 67 of a hybrid transformer 60. From the input, voice frequency energy goes through a compressor unit 68, through low pass filter 69 to a modulator 70. A channel oscillator 71 serves as a source of carrier frequency energy at a predetermined channel carrier frequency. The voice frequency modulated carrier energy is coupled through a variolosser 72 to a carrier frequency amplifier 73 and thence through a bandpass filter 74 to transformer 75. Carrier frequency energy from transformer 75 is coupled through a filter comprising inductor 76 and capacitor 77 and through branch leads 47 to transmission line 14.

D.C. power to operate the transmitter section 66 is supplied by a regulated power supply unit 78 via a keying transistor 79. When telephone 62 is raised to its "off-hook" condition, hook switch 63 is closed and a resistance circuit is presented to handset terminals T and R and current flows from power supply 78 through dropping resistor 80, winding 61 of hybrid transformer 60, through handset 16 to winding 81 of hybrid transformer 60 and thence through resistor 82 to ground. The voltage drop developed across resistor 80 is communicated through resistor 83 to the base of a switching transistor 84 causing it to switch to a conducting state. Current from power supply 78 then flows through switching transistor 84 and through resistors 85 and 86 to ground. The resulting voltage drop across resistors 85 and 86 is communicated through resistor 87 to the base of keying transistor 79 causing it to conduct current from power supply 78 to transmitter section 66, The voltage drop that appears across resistor 86 is applied, as a bias voltage to the base of voice frequency amplifier transistor 58 thus activating the voice frequency amplifier. A diode 88 is connected from the base of keying transistor 79 to the 6.8 volt output of power supply 78 and serves as a regulator to prevent the emitter voltage of transistor 79 from rising above 6.8 V. Thus, when handset 16 is put into the "off-hook" condition, the voice frequency amplifier 58 and the transmitter section 66 are activated and the station terminal is in a condition for two-way voice communication. D.C. current flowing through telephone 62 is modulated by voice energy to provide the voice frequency input to transmitter section 66.

Input power for power supply 78 is provided by connections to transmission line 14 through a bridge rectifier comprising diodes 90*a*, 90*b*, 90*c* and 90*d*.

With reference to FIG. 2, when a call originating from any place in the telephone system is directed to a station terminal, an A.C. ringing voltage, generated within the central office switching unit, is applied between the leads of the primary of the hybrid transformer 23 of the carrier channel unit to which the call is directed. Part of the ringing voltage appears at the common point of two resistors 91 and 92. From the common point of the resistors the ringing voltage is coupled through blocking capacitor 93 to a rectifier circuit comprising diodes 94 and 95 and a filter comprising capacitor 96 and resistor 97. The D.C. voltage obtained from the rectifier circuit activates a 300 hertz ringing signal oscillator 98. The output of ringing oscillator 98 is connected by lead 99 to the input of the carrier channel unit transmitter section 17. The 300 hertz ringing signal modulates the transmitter carrier oscillator and is then transmitted to transmission line 14 in the manner described before.

With reference now to FIG. 3, the 300 hertz ringing signal is detected in the receiver section 50 of the station terminal which is tuned to receive the carrier frequency of the carrier channel unit to which the call was directed. The ringing signal is conveyed by a branch lead 100 to a ring generator 64 which generates a pulsating ringing voltage which is coupled to the telephone handset 16 through lead 101 and activates telephone bell 65 in a conventional manner.

When the called party lifts his telephone, hook switch 63 closes and the station terminal transmitter is activated in the manner before described. The D.C. power which activates transmitter section 66 is connected by a branch lead 102 to ring generator 64 and functions as a bias voltage to deactivate the ring generator so long as hook switch 63 is in the "off-hook" condition. Activation of the transmitter section causes the station terminal carrier frequency energy to be transmitted via transmission line 14 back to the central office station where it is routed to its respective carrier channel unit.

With reference again to FIG. 2, when the call is answered from the station terminal, that is, when carrier frequency energy is present at the input of carrier channel unit receiver section 18, the detector 28 provides a current through a control amplifier 31 and thence to a relay coil 35 which is thus energized, causing its contacts 103 to close. When contacts 103 close, the carrier channel unit is connected to the central office switching unit for talking, and the central office signaling system detects the resulting impedance change and stops the ringing voltage.

In a like manner, when a call originates at a station terminal, the handset is lifted causing the "off-hook" condition which turns the station terminal transmitter "on" causing carrier frequency energy to be transmitted via transmission line 14 to the respective carrier channel unit. As before, the carrier frequency energy is detected by the carrier channel unit receiver section and causes relay contacts 103 to close. Dial tone signal present in central office switching unit is transmitted back to the station terminal indicating to the calling party that a line is available in the central office switching unit and that the calling party may proceed to dial the number desired. Activation of the dial portion of a telephone handset acts to present alternate "open circuit" and resistance circuit conditions to the terminals T and R in accordance with the digital information dialed. This alternately causes the carrier frequency energy to be turned on and off in accordance with the digital information, thus providing a method of transmission of dial pulse information to the central office terminal.

With reference now to FIG. 1, operation of the remote test circuit will be described.

When remote test switch 42 is in its "normal" position, power for operating the station terminals is connected to transmission line 14. Current flows from a positive lead 104 of common equipment power supply through test switch 42 and filter 43 to a first wire of transmission line 14 and thence to the station terminals. Current returns from the station terminal via a second wire of transmission line 14 through filter 43 and test switch 42 to the negative lead 105 of common equipment power supply 41.

In FIG. 3 there is shown a branch lead 106 from the second or normally negative wire of transmission line 14 through a dropping resistor 107 and a blocking diode 108 to the base of keying transistor 79. Blocking diode 108 has its anode connected to the base of keying transistor 79 and thereby current from the negative wire of transmission line 14 is prevented from flowing to the base of the keying transistor.

When it is desired to test the operating status of the station terminals, the remote test switch 42 is urged from its "normal" position to the "test" position. Operation of the remote test switch causes the polarity of the current supplied to the transmission line to be reversed, that is, when the remote test switch is urged to its momentary "test" position, the first wire of transmission line 14 is connected to the negative lead 105 of the common equipment power supply and the second, or normally negative wire of the transmission line is connected to the positive lead 104 of the common equipment power supply. Activation of the remote test switch 42 thus reverses the direction of current flow through the transmission line 14 to the station terminals.

With reference now to FIG. 3, when the remote test switch is operated and the current flow to the station terminals is reversed, the operation of the station terminal power supply 78 is unaffected due to operation of the bridge rectifier 90. When the remote test switch is in its "normal" position, current flows from the normally positive first wire of transmission line 14 through diode 90*d* of the bridge rectifier and into positive input lead 109 and from negative input lead 110, through diode 90*b* to the normally negative second wire of the transmission line.

When remote test switch 42 is in its "normal" position, current from the normally negative second wire of the transmission line is prevented from flowing to keying transistor 79 by the action of blocking diode 108, but when the remote test switch is activated and the electrical polarity of the transmission line is reversed, a positive current then flows through branch lead 106, dropping resistor 107 and through blocking diode 108. Dropping resistor 108 is sized to provide the correct bias voltage for keying transistor 79 so that it is biased into a conducting state. When keying transistor 79 is thus caused to conduct, operating power is applied to station terminal transmitting section 66 in exactly the same manner as when telephone 62 is raised causing an "off-hook" condition to occur. When operating power is applied to transmitting section 66, the carrier frequency energy is transmitted to its respective carrier channel unit if the station terminal is in an operative status.

With reference again to FIG. 2, when activation of remote test switch 42 causes the station terminal to transmit carrier frequency energy, the transmitted energy is detected in the detector 28 of the respective carrier channel unit, thus providing an operating voltage for control amplifier 31 in the same manner as when the station terminals are being operated to initiate a call. When the carrier frequency energy is detected, control amplifier 31 provides current to operate relay coil 35 and light emitting diode 36 is turned on indicating that its respective station terminal is in an operating status. If light emitting diode 36 of any one, or all, of the carrier channel units does not come on, or light up when remote test switch 42 is put into the "test" position, then an inoperative status is indicated and action can be taken to correct the inoperative condition.

Although a preferred embodiment of the invention has been described in detail, it is to be understood that various changes, substitutions and alterations can be made in the steps of the invention without departing from the spirit and scope of the invention as defined by the appended claims.

What is claimed is:

1. An apparatus for indicating at a central office terminal unit the operative status of a remote carrier telephone station terminal comprising:

a switch at the central office terminal unit for reversing polarity of D.C. operating power for the remote station terminal;

means at the remote station terminal for detecting the polarity reversal of the operating power and activating a transmitter section of the station terminal in response thereto causing the transmitter section to generate carrier frequency energy; and means within the central office terminal for indicating the presence of station terminal carrier frequency energy and whereby the operative status of the remote station terminal becomes known.

2. An apparatus according to claim 1 wherein the detecting means is a keying transistor interposed between a power supply and a transmitter section and having a connection from said transistor base through a diode to a normally negative one of a pair of transmission wires, said diode having an anode connected to said one transmission wire and a cathode connected to said transistor base such that current flow from said one transmission wire is prevented when said one transmission wire is electrically negative with respect to said transistor base.

3. An apparatus according to claim 1 wherein the indicating means is a light emitting device having an amplifier transistor for supplying current thereto, said transistor having a base connected to a detector unit such that said amplifier transistor supplies current to said light emitting device whenever carrier frequency energy is received by said detector unit.

4. An apparatus according to claim 3 wherein the light emitting device is a light emitting diode.

5. An apparatus according to claim 1 wherein the switch is interposed between a common equipment power supply unit and a two wire transmission line, said switch having a double-pole double-throw configuration and wired such that when the switch is in a normal position, power is supplied to the wires of the transmission line in a first relative electrical polarity and when the switch is in a test position the power supplied to the wires of the transmission line is in a second relative polarity, being the reverse of said first relative polarity.

6. A method of testing the operative status of a remote carrier telephone station terminal from a central office, including the steps of:

reversing, at the central office, the relative polarity of D.C. power for operating remote station terminal;

detecting at the remote station terminal the reversed polarity and activating a transmitter section of the station terminal to generate carrier frequency energy in response thereto; and indicating, at the central office, the presence of carrier frequency energy by activating an indicating device in response thereto.

* * * * *